United States Patent [19]

MacPhee

[11] 3,786,356
[45] Jan. 15, 1974

[54] GROUND FAULT DETECTOR
[75] Inventor: Colin A. A. MacPhee, West Hill, Ontario, Canada
[73] Assignee: Federal Pacific Electric Company, Newark, N.J.
[22] Filed: June 30, 1972
[21] Appl. No.: 268,093

Related U.S. Application Data
[63] Continuation of Ser. No. 180,572, Sept. 15, 1971, abandoned.

[52] U.S. Cl. .............................. 317/18 D, 317/27 R
[51] Int. Cl. ............................................. H02h 3/26
[58] Field of Search ..................... 317/18 D, 27 R; 324/51; 307/92

[56] References Cited
UNITED STATES PATENTS
3,555,360  1/1971  Lee et al. ......................... 317/18 D
3,638,072  1/1972  Kobayashi et al. ............... 317/18 D Primary Examiner—James D. Trammell
Attorney—Paul S. Martin

[57] ABSTRACT

Ground fault protectors commonly use a differential current transformer for sensing ground-fault current, and a level detector causes opening of the load circuit in response to ground-fault current above a tripping level. A current loop develops around the core of the differential transformer in case a fault develops between the "white" or neutral load-circuit conductor and the ground-return current path, this loop having the effect of reducing the sensitivity of the ground-fault sensing means. A test signal is applied to the differential transformer at frequent short intervals, and tripping of a load-circuit interrupter results if such reduced sensitivity should develop. The level detector is made less sensitive during application of the test signal, to prevent opening of the load circuit in response to the test signal, but even during the test-signal intervals the level detector remains responsive to greater-than-minimum ground-fault signals. The circuit interrupter opens in case of reduced sensitivity of the ground fault sensing means due to any cause.

8 Claims, 1 Drawing Figure

PATENTED JAN 15 1974  3,786,356
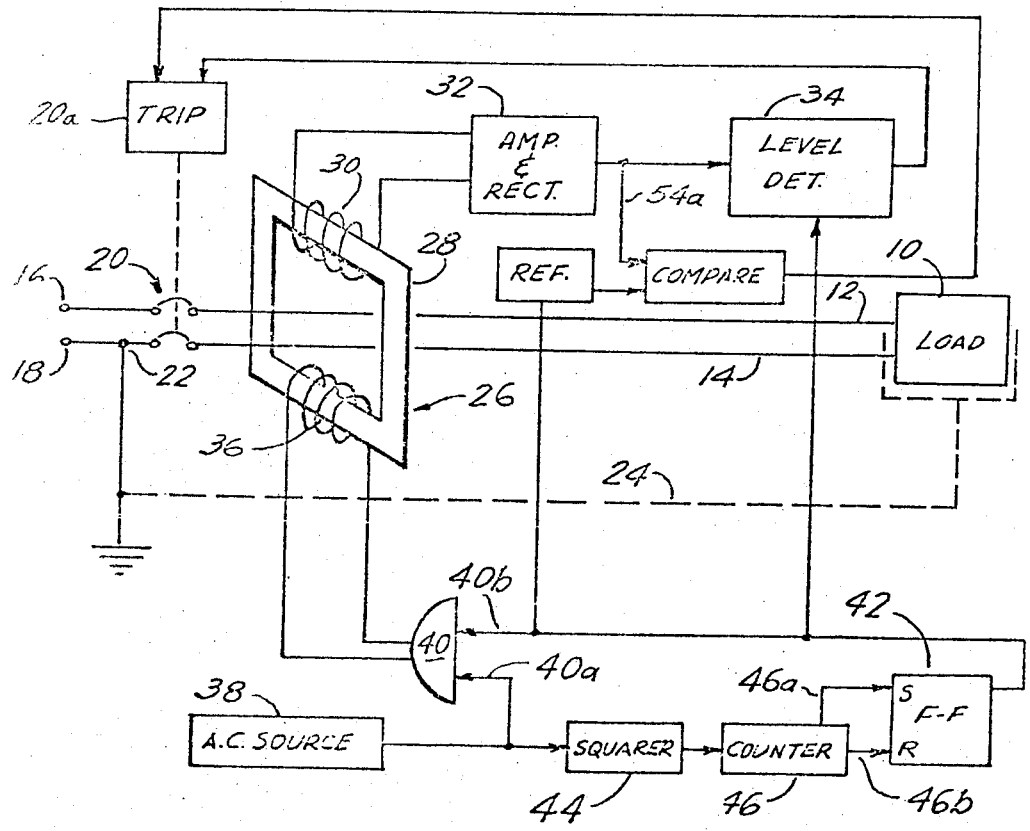

GROUND FAULT DETECTOR

This is a continuation of application Ser. No. 180,572, filed Sept. 15, 1971, now abandoned.

The present invention relates to ground-fault protectors for alternating current circuits.

Various devices have been proposed from time to time for interrupting the connection between an alternating-current source and a branch circuit in case a ground fault should develop. A common form of ground fault protector involves a differential current transformer (DCT) and a level detector for causing a circuit interrupter to open upon occurrence of ground-fault current above a prescribed threshold. Not unusually, the circuit to be protected includes a neutral conductor as one of the load-circuit wires linking the core of the DCT. There is little danger of hazardous ground-fault current developing if a fault should develop between only the neutral wire and ground. However, the neutral wire is grounded at the alternating current supply point, and a neutral-to-ground fault in the load circuit forms a current loop around the core of the DCT which reduces the responsiveness of the DCT to fault current between another load-circuit conductor and ground. Thus, where a ground fault protector should respond to ground fault current at and above 5 milliamperes, for example, the occurrence of a neutral-and-ground-path loop can raise the trip threshold to a value substantially greater than 5 milliamperes.

An object of the present invention is to improve ground fault protectors by providing a novel safeguard against the consequences of the foregoing loss-of-sensitivity problem. This object of the invention is achieved by providing a sensitivity checker that causes opening of the circuit interrupter in case of difficient sensitivity of the ground fault sensing means. The sensitivity checker includes a means for applying a test signal to the ground-fault sensing means, to open the circuit interrupter in case of inadequate response of the ground-fault sensing means. As a further feature of the invention, it is evident that opening of the circuit interrupter results from a reduction in sensitivity of the ground-fault sensing means regardless of what may have caused that reduction in sensitivity. Accordingly, this feature represents a fail-safe characteristic of both the sensing means and the test-signal applying means.

The nature of the invention, including the foregoing and further advantages and novel features, will be apparent from the detailed description that follows of an illustrative embodiment of the various aspects of the invention.

In the accompanying drawing:

The single FIGURE is a block diagram of the illustrative embodiment of the invention.

In the drawing, a load 10 is shown connected by conductors 12 and 14 to a 60 Hz. alternating current supply represented by terminals 16 and 18, the latter of which has a connection 22 to ground. A circuit interrupter 20 is interposed between load 10 and load conductors 12 and 14 at one side of the interrupter and terminals 16 and 18 and ground connection 22 at the opposite side of the interrupter. This circuit interrupter may be a contactor or a circuit breaker of any conventional construction having a means for causing automatic opening of the contacts in response to an applied control signal. Diagrammatically illustrated tripper 20a causes opening of the contacts when a control signal is applied, but otherwise the contacts, when closed, remain closed under control of tripper 20a. It will of course be understood that other supplemental tripping arrangements can be included for response to an overload or remote control or the like. A broken line 24 represents a ground-current return path. In one conventional wiring arrangement, load conductor 14 or "neutral" is called a "white" wire, the ungrounded load conductor 12 is called the "black" wire and path 24 is a ground-return wire called the "green" wire. In some cases conductor 24 is the metallic shield surrounding the load-current carrying conductors 12 and 14, and in other situations current path 24 may simply be the actual earth current path.

It is a hazardous condition if ground fault Y should develop between wire 12 and ground return 24. Such a current path could develop through the body of a person accidentally touching wire 12 while standing on a grounded surface. A ground-fault tripper is provided for causing opening of contactor 22 in response to such ground-fault current. This ground-fault tripper includes a differential current transformer generally designated 26 including a closed-loop magnetic core 28 and an output winding 30. Conductors 12 and 14 are primary windings on core 26 so related that the magnetic effects of equal currents in conductors 12 and 14 are mutually cancelling and produce no net magnetic flux in core 28. The output of winding 30 is applied to an amplifier and rectifier unit 32. Upon the occurrence of a current path Y, the current in conductor 12 is partly diverted to the alternating current supply by way of ground conductor 24, and therefore the differential current transformer 26 produces output in winding 30 and correspondingly amplifier and rectifier unit 32 produces direct-current output that is a direct function of the current in ground-fault current path Y although not necessarily linear response. The output of unit 32 is applied to level detector 34; and this detector applies a tripping signal to tripper 20a when the level of signal from unit 32 exceeds a prescribed threshold level. As a typical standard, detector 34 is set to have a normal operating level such that, when 5 milliampers or more flows in current path Y, detector 34 causes tripper 20 a to operate and cause opening of the circuit interrupter 20.

In practical experience, a ground-fault current path X can develop between white wire 14 and ground-return current path 24. If that should occur, then the current in ground-fault path Y returns to alternating current supply terminal 18 partly by way of the ground-return path 24 and partly through current path X and while conductor 14. To the extent that any of the ground fault current in path Y returns through conductor 14, that component of the current is not measured by the ground-fault sensing means 26, 32. Thus, the occurrence of a ground-fault current path X has the effect of reducing the sensitivity of the ground fault sensing means 26, 32. Considered from another point of view, when the ground fault current path X appears, a current loop is developed through core 28 consisting of conductor 14, current path X, current path 24 and connection 22. This closed-loop current path has the effect of loading core 28 and of decreasing the sensitivity of the ground-fault current sensing means.

The following provision is made for insuring operativeness of the system to respond with the desired sensitivity to a ground fault current occurring along path Y. Winding 36 on core 26 transmits a test alternating current signal from source 38 through gate 40. Source 38 may be a 60 cycle source of signal. Optionally it can be derived from alternating current terminals 16 and 18; but it can also be a frequency that differs from 60 Hz. In this connection 40b is periodically biased to permit transmission of an alternating current test signal applied to input connection 40a. For purpose of providing control bias on input 40b, a flip-flop 42 is provided. Squaring circuit 44 converts the signal from alternating current source 38 to a train of square waves, and these are counted by counter 46. When the counter reaches some part of its total count capacity, it emits a signal on output 46a which sets flip-flop 42, and when the counter reaches its full capacity it sends a reset signal to flip-flop 42 on line 46b. Accordingly, flip-flop 42 is set for applying and enabling bias on line 40b during a relatively short train of alternating current waves from source 38; and between the periods when enabling bias is applied to line 40b, there are long trains of alternating current waves that are blocked by disabling bias on line 40b.

During the times when a test signal is applied to winding 36, the same signal that is applied to line 40b by flip-flop 42 is applied via line 48 to reduce the sensitivity of level detector 34. If the test signal applied to winding 36 is sufficient to produce an output from unit 32 equivalent to a 5 milliampere leakage current in current path Y, then any reduction in the sensitivity of level detector 34 would render the level detector nonresponsive to the test signal. However, there may be a safe level of leakage in current path Y and it is undesirable that the current interrupter should open in response to such a condition. Therefore, it is desirable for the sensitivity level of detector 34 to be reduced substantially, for example to a level such that an output signal from level detector 34 for operating tripping circuit 20a appears only in response to the equivalent of a 10 or even a 20 milliampere ground fault current in path Y during application of the test signal to winding 36.

During the times when an enabling signal is supplied to line 40b and that signal reduces the sensitivity of detector 34, the same signal is also supplied via line 50 to a reference signal supply unit 52. This reference signal is applied to comparer 54. During the times when the reference signal is being applied to the comparer, the output of unit 32 is also applied to another input of the comparer 54. In a sense, comparer 54 is another level detector, and is arranged to provide a tripping signal for tripper 20a only when the response of the sensing means 26, 32 is less than that which should result at the output of unit 32 as a result of a ground fault current in path Y when no test signal is applied to winding 36. However, if the sensitivity of sensing means 26, 32 is demonstrated to be proper by an adequate signal on line 54a, then the tripper 20a is not activated.

It will be recalled that the appearance of a current path X has the effect of reducing the sensitivity of the sensing means 26, 32 by virtue of the current loop that develops linking core 26, namely, current path X, conductor 24, terminal 22 and conductor 14. Thus, the sensitivity of the sensing means is reduced when a current path X develops and this reduced sensitivity would cause tripping of the current interrupter by an inadequate signal on line 54a during the times when the test signal is applied to winding 36.

The duration of the test signal can be set at 0.1 second or it could be made shorter as may be desired, by using a higher frequency test signal than 60 Hz. The test signal can recur every few seconds or more frequently.

From the foregoing, it is clear that in case a ground fault should appear at path X, such as would reduce the sensitivity of the system to respond to ground fault currents in path Y, the current interrupter opens automatically in response to a test signal. This provides assurance that the protective apparatus is in operative condition and will respond with desired sensitivity if and when a dangerous ground fault current should develop in path Y.

Various rare special situations can possibly occur and even then the described system performs proficiently.

As one possible condition, a fault can develop in path X and simultaneously a fault can develop in path Y. If the sensitivity of tripping means 26, 32 and 34 is not unduly reduced, tripping will occur normally. In that condition, if the sensitivity should be reduced so as to prevent tripping by detector 34, the next test signal would result in a tripping signal appearing at the output of comparator or second level detector 54. As a further condition, a large ground fault response could appear at the output of unit 32 due to a severe ground fault at path Y, and this could occur during the time when the test signal is being applied to winding 36. In that case level detector 34 would respond if the signal were great enough to compensate for the reduced sensitivity of level detector 34 due to the bias on line 50.

According to C.S.A. standards, one application of ground-fault protectors requires circuit-opening operation within 25 milliseconds at a fault current of 250 milliampers and above, and within 7 seconds at the threshold value of 5 milliamperes; and a straight-line-curve on a log-log scale is required between those points. Level detector 34 having such a time-delay characteristic can be used in the circuit of the drawing without providing the desensitizing connection 48. A test signal of at least 5 milliamperes but much smaller than the instantaneous cut-in value of 250 milliamperes can then be used, its duration limited to a brief period within the 7-second range. The test signal should be repeated frequently, and should recur more frequently than every 7 seconds in a system designed to meet the foregoing CSA specifications, in order to insure ground fault tripping in response to ground faults developing simultaneously in paths X and Y.

I claim:

1. A ground fault protector for a load circuit including a first conductor and at least one additional conductor connected to an alternating-current supply one terminal of which is connected to said first conductor and to ground, said protector including a circuit interrupter for opening the connection from the alternating current supply to the load circuit, first means for providing a trip signal to cause said circuit interrupter to open in response to the occurrence of a ground-fault current between said additional conductor and ground, said first trip-signal providing means including ground fault sensing means disposed between said load circuit and the grounded terminal of said alternating current supply connection, said first trip-signal providing means further including a first level detector for causing the circuit interrupter to open in response to output from the ground-fault sensing means of at least a prescribed magnitude, said ground fault protector including a second means for providing a trip-signal to cause the circuit interrupter to open in case of a loss of sensitivity of said sensing means, said second trip-signal providing means including said sensing means and further including means for applying to said sensing means a test alternating current signal of prescribed magnitude and duration, said protector having means effective for the duration of the applied test signal for causing said first level detector to be non-responsive to that output of the sensing means which results from the applied test signal, and said second trip-signal providing means including a second level detector responsive to said sensing means for causing the circuit interrupter to open in case the output of the sensing means should be less than a prescribed level during application of the test signal, said second trip-signal providing means including means for coordinating the operation of said test signal applying means and said second level detector.

2. A ground fault protector in accordance with claim 1, wherein said second trip-signal providing means includes nmeans activated by said coordinating means for providing a trip signal to said second level detector to cause opening of the circuit interrupter, and wherein said second level detector is adatped to prevent the trip signal of said second trip-signal providing means from causing the circuit interrupter to open when the response of the sensing means to the applied test signal evidences proper performance of the test signal applying means and the ground fault sensing means.

3. A ground fault protector in accordance with claim 1, wherein said coordinating means includes means coordinated with the application of the test signal to the sensing means for reducing the sensitivity of said first level detector so as to be non-responsive to that level of output of said sensing means which results when a test signal is applied.

4. A ground fault protector in accordance with claim 1, wherein said level of level detector has a time delay characteristic rendering it non-responsive to the output of the sensing means in response to the level and duration of the applied signal.

5. A ground fault protector in accordance with claim 1, including means causing said test signal applying means to produce test signals automatically at frequent intervals, the duration of each test signal being a small fraction of each such interval.

6. A ground fault protector for a load circuit, including means for interrupting the load circuit, ground-fault sensing means, first means responsive to output from said ground-fault sensing means of at least a threshold level for causing said interrupting means to break the load circuit, and means for testing said ground-fault sensing means to verify the effectiveness thereof, said last-named means including means operative during test periods for applying a test signal to said sensing means, and second means responsive to said sensing means and coordinated with said test signal applying means for causing the interrupting means to break the load circuit in case of sub-normal output of the sensing means in response to the test signal.

7. A ground fault protector in accordance with claim 1, further including means effective during application of the test signal for rendering said first responsive means ineffective to cause operation of said interrupting means in response to output of said sensing means resulting from application of said test signal thereto.

8. A ground fault protector in accordance with claim 1, further including means effective during application of the test signal for rendering said first responsive means ineffective to cause operation of said interrupting means in response to output of said sensing means resulting from application of said test signal thereto, without interfering with operation of the interrupting means in response to output of the sensing means substantially greater than the output resulting from application of the test signal thereto.

* * * * *